Figure 1:
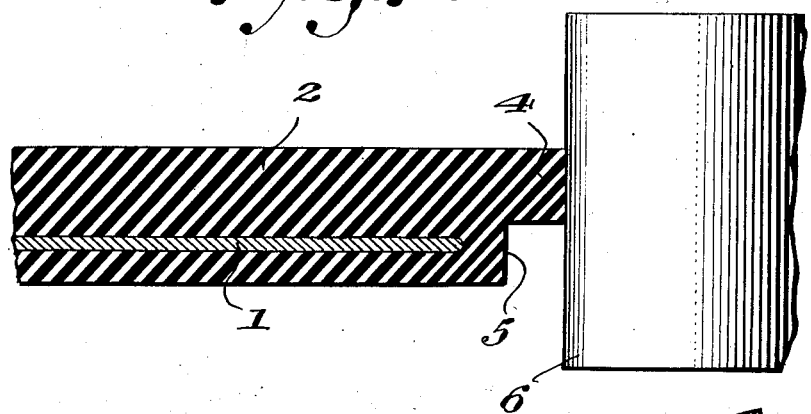

Sept. 9, 1958  S. O. P. OLSSON  2,851,152
STEEL CONVEYORS COVERED WITH ELASTOMER
Filed March 22, 1955

SVEN O. P. OLSSON
INVENTOR.

BY Wenderoth, Lind & Ponack

ATTYS.

United States Patent Office 2,851,152
Patented Sept. 9, 1958

2,851,152

STEEL CONVEYORS COVERED WITH ELASTOMER

Sven Olle Paul Olsson, Trelleborg, Sweden, assignor to Trelleborgs Gummifabriks Aktiebolag, Trelleborg, Sweden, a corporation of Sweden Application March 22, 1955, Serial No. 496,030

3 Claims. (Cl. 198—193)

It is known to use steel conveyors which are provided with an elastomer covering for the inside and outside surfaces of the steel conveyor. In the known conveyors of this kind the lateral edges of the elastomer covering are parallel to a vertical plane through the longitudinal center line of the conveyor and extend around the lateral edges of the steel conveyor embedded in the elastomer covering. When edge guiding rollers are used for such known conveyors in order to keep the conveyors in a particular path it may occur that one lateral edge of the steel conveyor wears through the covering towards the guide rollers located on one side of the conveyor, whereby the conveyor is quickly destroyed.

This drawback is eliminated by the device according to the present invention which is characterized by the feature that the covering in the width direction of the conveyor has a larger total width above and/or below the steel conveyor than in the area of the thickness of the steel conveyor.

For the better understanding of the invention two preferred embodiments thereof as applied to an arrangement in steel conveyors covered with elastomers will now be described by way of example with reference to the accompanying drawing.

On the drawing

Figure 2:
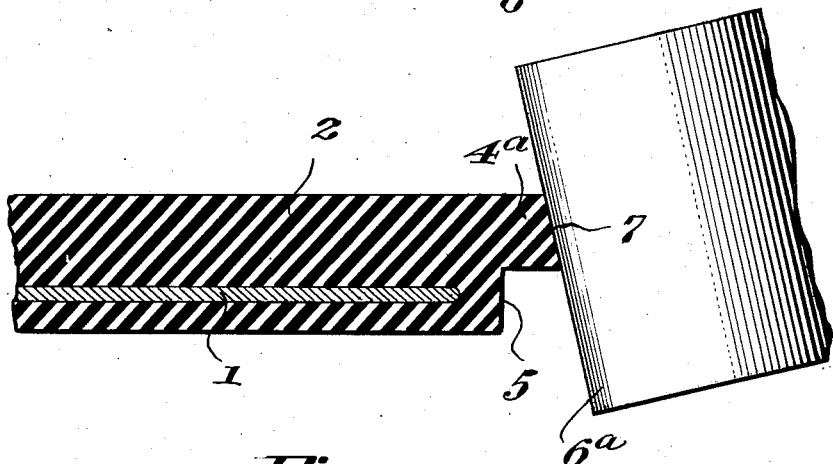

Figs. 1 and 2 show a cross-section through a marginal portion of two conveyors constructed in accordance with the invention and having adjacent guide rollers.

In the drawing 1 designates a steel core completely embedded in a covering 2 of a suitable elastomer, e. g. natural rubber. The elastomer covering 2 is, in the ordinary manner, considerably thicker on the upwardly facing outer side of the steel core 1 than on the downwardly facing inner side of the conveyor.

In the embodiment according to Fig. 1 the elastomer covering 2 has a considerably greater total width in the width direction of the core above the upwardly facing outer side of the steel core 1 in Fig. 1 than in the zone between the planes of the outer and inner sides of the steel core which define the thickness of the steel core 1 when the planes are extended through the plane of the edge of the covering; this has been achieved by each lateral edge portion of the covering 2 having a portion 4 projecting in the width direction of the core from a lateral edge 5 of the covering 2 which is parallel to a vertical plane through the longitudinal center line of the conveyor, the remainder of said edge 5, which is spaced from the lateral edge of portion 4 in a direction toward the core 1, extending from the downwardly facing inner side of the portion 4 of the covering in Fig. 1 past the lateral edge of the steel core 1. In Fig. 1 the projecting portion 4 has a lateral edge surface which is parallel to a vertical plane through the longitudinal center line of the core and against which a guiding roller 6 for the conveyor rests. The edge of portion 4 is the only one against which the roller 6 bears. By means of this embodiment the contact forces between the projecting portion 4 and the guide roller 6 will be distributed in the elastomer covering 2 in such a way that the lateral edge of the steel core 1 does not have an opportunity of exerting any cutting force on the elastomer covering inside the surface 5.

The embodiment according to Fig. 2 coincides essentially with the embodiment according to Fig. 1 except that the portion 4a projecting from the lateral edge 5 in the width direction of the conveyor has a lateral edge surface 7 which is inclined to a vertical plane through the longitudinal center line of the conveyor and against which an inclined guiding roller 6a rests. This embodiment gives a still better result than the embodiment according to Fig. 1 in certain types of conveyors.

Of course, the invention must not be considered as limited to the embodiments described above and shown in the drawing, for many modifications are possible without departing from the inventive idea. It must be pointed out in particular that the transition between the projecting portion 4a and the inner side surface of the covering 2 which faces downwardly in the drawing may consist of, for instance, a concavely curved surface instead of a lateral edge surface 5, for the important thing is that the covering 2 must not rest against the guide roller 6 or 6a in the area of the thickness of the steel core 1.

What I claim and desire to secure by Letters Patent is:

1. An endless conveyor belt comprising a sheet steel core having an outer side and an inner side spaced from each other by the thickness of the core, and having two lateral edges spaced from each other by the width of the core, and an elastomer covering completely encircling said core, said covering having straight lateral guide roller engaging edge surfaces thereon extending in the direction of the thickness thereof for engaging guide rollers for the belt, said edge surfaces being entirely outside of a zone between the planes of the outer and inner sides of the sheet steel core extended through the planes of said edge surfaces, and further edge surfaces on said covering extending through said zone between the extended planes of said inner and outer sides of said core, said further edge surfaces being spaced from each other in the direction of the width of said belt a distance less than said guide roller engaging surfaces and being spaced from said guide roller engaging edge surfaces in a direction toward said core, whereby said further edge surfaces are not engageable by guide rollers engaging said guide roller engaging edge surfaces.

2. An endless conveyor belt comprising a sheet steel core having an outer side and an inner side spaced from each other by the thickness of the core, and having two lateral edges spaced from each other by the width of the core, and an elastomer covering completely encircling said core, said covering having straight lateral guide roller engaging edge surfaces thereon extending in the direction of the thickness thereof for engaging guide rollers for the belt, said edge surfaces being entirely on only one side of a zone between the planes of the outer and inner sides of the sheet steel core extended through the planes of said edge surfaces, and further edge surfaces on said covering extending through said zone between the extended planes of said inner and outer sides of said core, said further edge surfaces being spaced from each other in the direction of the width of said belt a distance less than said guide roller engaging surfaces and being spaced from said guide roller engaging edge surfaces in a direction toward said core, whereby said further edge surfaces are not engageable by guide rollers engaging said guide roller engaging edge surfaces.

3. An endless conveyor belt as claimed in claim 2 in which said guide roller engaging edge surfaces are inclined with respect to the longitudinal central plane of the endless conveyor belt.

References Cited in the file of this patent

UNITED STATES PATENTS

| 2,321,580 | Conradson | June 15, 1943 |
| 2,712,332 | Annerhed | July 5, 1955 |

FOREIGN PATENTS

| 521,817 | Germany | Mar. 27, 1931 |